(12) United States Patent
Barth et al.

(10) Patent No.: US 11,976,176 B2
(45) Date of Patent: May 7, 2024

(54) METHOD FOR PRODUCING A FILM COMPRISING THERMOPLASTIC POLYMER AND INORGANIC FILLER

(71) Applicant: BRÜCKNER MASCHINENBAU GmbH, Siegsdorf (DE)

(72) Inventors: Jan Barth, Siegsdorf (DE); Roland Lund, Übersee (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 454 days.

(21) Appl. No.: 17/267,201

(22) PCT Filed: Jul. 25, 2019

(86) PCT No.: PCT/EP2019/070021
§ 371 (c)(1),
(2) Date: Feb. 9, 2021

(87) PCT Pub. No.: WO2020/030433
PCT Pub. Date: Feb. 13, 2020

(65) Prior Publication Data
US 2021/0301101 A1    Sep. 30, 2021

(30) Foreign Application Priority Data
Aug. 10, 2018   (DE) ..................... 10 2018 119 541.9

(51) Int. Cl.
*C08J 5/18*     (2006.01)
*B32B 38/00*    (2006.01)
(Continued)

(52) U.S. Cl.
CPC .................. *C08K 3/26* (2013.01); *C08J 5/18* (2013.01); *C08L 23/12* (2013.01); *B32B 27/327* (2013.01);
(Continued)

(58) Field of Classification Search
CPC .......... B29C 55/00–30; B29D 7/00–01; B32B 27/32–327; B32B 2038/0028;
(Continued)

(56) References Cited

U.S. PATENT DOCUMENTS 3,903,234 A * 9/1975 Ikeda ...................... B29C 55/12
264/211
5,008,296 A   4/1991 Antoon, Jr. et al.
(Continued)

FOREIGN PATENT DOCUMENTS

CN    1041167 A    4/1990
DE    196 22 082   11/1997
(Continued)

OTHER PUBLICATIONS

International Search Report for PCT/EP2019/070021 dated Nov. 7, 2019, 7 pages.
(Continued)

*Primary Examiner* — Richard A Huhn
(74) *Attorney, Agent, or Firm* — Nixon & Vanderhye P.C.

(57) ABSTRACT

A method for producing a film including at least 20 wt % thermoplastic polymer and 50 to 75 wt % inorganic filler, and including the steps of: providing the mixture, melting the mixture, producing a thin layer from the mixture, cooling the thin layer, producing a film, stretching the film in the longitudinal direction and in the transverse direction, wherein the particle size of the inorganic filler is at most 5 μm and the stretch ratio in the longitudinal direction and in the transverse direction is at least 3.5. The disclosure further relates to films produced by the method and to the use thereof.

16 Claims, 8 Drawing Sheets

(51) Int. Cl.
  *C08K 3/26* (2006.01)
  *C08L 23/12* (2006.01)
  *B32B 27/32* (2006.01)
(52) U.S. Cl.
  CPC ... *B32B 2038/0028* (2013.01); *B32B 2323/00* (2013.01); *C08J 2323/12* (2013.01); *C08J 2491/06* (2013.01); *C08K 2003/265* (2013.01); *C08K 2201/005* (2013.01); *C08L 2203/16* (2013.01)
(58) Field of Classification Search
  CPC .............. B32B 2323/00–16; C08J 5/18; C08L 23/00–16; C08L 2203/16
  See application file for complete search history.

(56) References Cited

U.S. PATENT DOCUMENTS

| | | | |
|---|---|---|---|
| 5,439,628 A | 8/1995 | Huang | |
| 6,083,443 A | 7/2000 | Eckart et al. | |
| 2002/0028320 A1* | 3/2002 | Iwasa | B41M 5/508 428/32.18 |
| 2012/0211189 A1 | 8/2012 | Huang et al. | |
| 2016/0318232 A1 | 11/2016 | Sumi et al. | |

FOREIGN PATENT DOCUMENTS

| | | |
|---|---|---|
| DE | 198 11 773 | 9/1999 |
| DE | 103 14 900 | 10/2003 |
| EP | 0 352 802 | 7/1989 |
| EP | 0 459 142 | 4/1991 |
| EP | 2 716 696 | 10/2017 |
| EP | 3 339 355 | 6/2018 |
| JP | 2-127445 | 7/1989 |
| JP | 3021654 | 2/1996 |
| JP | 2001556 | 6/1998 |
| JP | 2000001556 A * | 1/2000 |
| JP | 2001301001 | 10/2001 |
| JP | 2006160981 | 6/2006 |
| JP | 2009-28678 A | 2/2009 |

OTHER PUBLICATIONS

Written Opinion of the ISA for PCT/EP2019/070021 dated Nov. 7, 2019, 7 pages.
Notification of the First Office Action for Chinese Application No. 201980052722.2, two pages, dated Jan. 10, 2023.
International Preliminary Report on Patentability issued in PCT App. No. PCT/EP2019/070021 (dated Feb. 16, 2021).
Japanese Office Action with English Machine Translation cited in Patent Application 2021-506994 dated May 10, 2023, six (6) pages.
Japanese Office Action for Japanese Application No. 2021-506992, three pages, dated Sep. 5, 2023.
Japanese Examiner's English Comments regarding the JP Office Action, one page, dated Sep. 5, 2023.

* cited by examiner

METHOD FOR PRODUCING A FILM COMPRISING THERMOPLASTIC POLYMER AND INORGANIC FILLER

This application is the U.S. national phase of International Application No. PCT/EP2019/070021 filed Jul. 25, 2019 which designated the U.S. and claims priority to DE Patent Application No. 10 2018 119 541.9 filed Aug. 10, 2018, the entire contents of each of which are hereby incorporated by reference.

INTRODUCTION

The present invention relates to a method for producing a film comprising at least 20 wt % of thermoplastic polymer and 50 to 75 wt % of inorganic filler and comprises the steps of: providing the mixture, melting the mixture, producing a thin layer (cast film) from the mixture, cooling the thin layer to produce a film, stretching the film in the longitudinal direction and in the transverse direction, the particle size of the inorganic filler being at most 5 µm and the stretching ratio in the longitudinal direction and in the transverse direction being at least 3.5. Films produced by this method and their use are also the subject matter of the present invention.

PRIOR ART

Films comprising plastics materials and fillers have been known for a long time. Films comprising thermoplastic polymer and inorganic fillers have been proposed as replacements for paper.

Polyolefin films with a filler content that are intended as a paper substitute are divided into different groups depending on the filler content. If the filler content is below 50 wt %, the film is more commonly referred to as a synthetic paper (also "SynPa") or an FPO film (filled polyolefin films). Stone papers are highly filled polyolefin films that contain calcium carbonate particles and a polyolefin such as polypropylene or polyethylene. Under certain circumstances, a mixture of the two plastics materials can also be used. The term "stone paper" is used when the filler content is greater than or equal to 50%.

When used as a paper substitute, these films have various advantages over traditional paper. Stone papers and synthetic papers are more resource-friendly in production than paper. The use of wood, water, acids, bleach and halogen is avoided. The used films can be recycled by simply melting them down. Stone papers and synthetic papers are waterproof and washable, have good strength and tear resistance and retain these mechanical properties under the influence of moisture. Due to the higher use of calcium carbonate, stone paper can be produced much more cheaply than synthetic paper. In addition, calcium carbonate is considered a renewable raw material. Stone paper therefore has a significantly better carbon dioxide balance than synthetic paper.

The stone papers known to date are mostly produced by blown film extrusion. Some films are stretched in the longitudinal direction (MD) after the blown film extrusion. There are also certain types of film which are produced by a simple cast extrusion or in the calendering process; if necessary, they are also then stretched in the longitudinal direction. Synthetic paper is usually a bi-axially stretched product, but the calcium carbonate fill levels are significantly lower than with stone paper. The fill levels of such synthetic papers are well below 50 wt % calcium carbonate.

So far it has not been possible to penetrate the market for paper products with stone paper on a large scale, since the stone papers known up to now differ in many respects from the properties of normal paper. For a stone paper that is intended to replace paper, it is important that the mechanical properties come as close as possible to the properties of paper, not only in order to offer the consumer at least the same utility value, but also so that stone papers can be further processed as far as possible using the known methods and apparatus for paper processing. For many further processing steps, a modulus of elasticity of at least about 500 MPa and a tensile strength of at least about 15 MPa in the longitudinal direction and in the transverse direction are required. The calcium carbonate content should be at least 50 wt % in order to reduce costs and keep the carbon dioxide balance as low as possible. At the same time, the density should not be significantly above 1 g/cm$^3$. On the one hand, a low density with the same mechanical properties leads to resource conservation and a reduction in costs; on the other hand, today's recycling processes sort products according to their density. If the density is significantly more than 1 g/cm$^3$, the film is not added to the polyolefinic recycling stream and is removed from the material cycle. A high calcium carbonate content increases the density, so that a high calcium carbonate content and a low density are contradicting requirements. A reduction in density can be achieved by stretching the film in the longitudinal direction, but this in turn impairs the modulus of elasticity and the tear resistance of the film.

The printability of stone papers on the market is also significantly inferior to that of conventional paper. Another property of paper that cannot be met by any known stone paper is its good foldability. Paper is easy to fold and remains in the folded position if enough pressure is applied. With stone paper, a significantly higher pressure has to be applied for folding than with paper and after folding the material exerts a restoring force (memory effect) and the fold is at least partially reversed. Stone papers can also break when folded with strong force. None of the films currently on the market can therefore fully meet the requirements of the paper industry.

US 2012/0211189 A1 describes the production of a mineral paper that can be reused by recycling, which contains 60 to 85 wt % natural mineral powder, 15 to 40 wt % polypropylene, which contains polylactic acid or polyethylene, and comprises 1 to 5 wt % auxiliary materials. The ingredients are mixed and pressed into film form.

Another method for producing filler-containing films is disclosed in EP 2 716 696 B1. Here, a mixture comprising a thermoplastic resin, an inorganic powder and an auxiliary material is cast into a film, cooled, and the film thus obtained is stretched by a factor of 1.1 to 3.0 in the longitudinal and transverse directions. Resin and inorganic powder are used in a ratio of 60:40 to 82:18 and the auxiliary materials are added in an amount of 0.05 to 4 wt %. The particle size of the inorganic powder is 0.5 to 15 µm and the density of the films is 0.55 to 1.40.

OBJECT OF THE INVENTION

The object of the present invention is to provide a method for producing a film, the properties of which come as close as possible to the properties of paper. The film should have a high proportion of filler, low density and good mechanical properties. Among the mechanical properties, good tear resistance and a good modulus of elasticity are particularly desirable. In particular, it is the object of the present invention to provide a method for producing a film in which these properties are balanced and the tear resistance and the modulus of elasticity are similar to those of paper. The film should also have good printability. Good foldability is also desirable.

DESCRIPTION OF THE INVENTION

The present invention relates to a method for producing a film comprising at least one thermoplastic polymer and at least one inorganic filler, comprising the steps of:
  providing a mixture comprising at least one thermoplastic polymer and at least one inorganic filler,
  melting the mixture,
  producing a thin layer (cast film) from the molten mixture,
    cooling the resulting thin layer to produce a film,
  stretching the film in the longitudinal direction and in the transverse direction, the proportion of the thermoplastic polymer in the film being at least 20 wt %, the proportion of the inorganic filler in the film being in the range from 50 to 75 wt % and the particle size of the inorganic filler being at most 5 μm, characterised in that the stretching ratio in the longitudinal direction is at least 3.5 and the stretching ratio in the transverse direction is also at least 3.5.

Here, the stretching ratio of the film in the longitudinal direction ($R_{longitudinal}$) is equal to the length of the film after stretching divided by the length of the film before stretching. The stretching ratio of the film in the transverse direction ($R_{transverse}$) is equal to the width of the film after stretching divided by the width of the film before stretching. The total stretching ratio is defined by $R_{total}=R_{longitudinal}*R_{transverse}$. In the following, the longitudinal direction is also abbreviated as "MD", the transverse direction as "TD".

In connection with the composition of the film and the high stretching ratios, the manufacturing process leads to a film with good mechanical properties and good printability.

If the filler content is below 50 wt %, the carbon dioxide balance is less favourable and the production costs are higher. If the filler content is above 75 wt %, stretching is not possible. If less than 20 wt % of thermoplastic polymer is used, stretching is likewise not possible and/or the mechanical properties and the printability suffer. If the film does not contain any other components besides the thermoplastic polymer and the inorganic filler, the proportion of the thermoplastic polymer is at least 25 wt %. All data in percent by weight (wt %) relate to the total mass of the film.

At stretching ratios lower than 3.5, the printability also suffers, in particular the standard deviation of the film thickness becomes too great. In addition, the density of the film decreases during stretching. If lower stretching ratios are used, the density of the film is therefore too high. With larger particle sizes, the mechanical properties suffer and the surface of the film becomes uneven, which in turn affects the printability.

The production method according to the invention also allows the stretching to take place in a controlled manner in the longitudinal and transverse directions. The mixture is preferably melted in a mixing and processing unit. The unit is particularly preferably selected from the group consisting of single-screw extruders, twin-screw extruders (co-rotating machines), bus kneaders or planetary roller extruders. Extruders are particularly preferred, and most preferred are extruders selected from the group consisting of single-screw extruders and twin-screw extruders (co-rotating machines).

To produce the film, the melt is preferably extruded. The melt is preferably discharged via a wide-slot nozzle. A cooling roller is preferably used for cooling. Furthermore, an air knife is preferably used, which applies the melt to the cooling roller. This allows for the production of a smooth, flat film that has cooled down as evenly as possible.

A method according to the invention is therefore particularly preferred for producing a film comprising at least one thermoplastic polymer and at least one inorganic filler, comprising the steps of:
  providing a mixture comprising the at least one thermoplastic polymer and the at least one inorganic filler,
  melting the mixture,
  extruding the molten mixture to produce a thin layer,
  cooling the resulting thin layer on a cooling roller to produce a film,
  stretching the film in the longitudinal direction and in the transverse direction,
  the proportion of the thermoplastic polymer in the film being at least 20 wt %, the proportion of the inorganic filler in the film being in the range from 50 to 75 wt % and the particle size of the inorganic filler being at most 5 μm, characterised in that the stretching ratio in the longitudinal direction is at least 3.5 and the stretching ratio in the transverse direction is also at least 3.5.

In the method according to the invention, the cooling roller temperature is preferably between 30 and 100° C. Lower temperatures are preferred in order to achieve rapid cooling. In the case of proportions of inorganic filler in the film of more than 60 wt %, however, the temperature is preferably from 80 to 100° C. and particularly preferably from 95 to 100° C. At lower temperatures, the melt or the melt film cannot be applied uniformly to the cooling roller, which leads to uneven cooling. A film with homogeneous properties over the entire surface of the film cannot be obtained in this way, or only with difficulty. The resulting film is then preferably cooled to room temperature (usually 23° C.)

The cooled, unstretched film is stretched in the longitudinal and transverse directions. This is preferably done by sequential stretching. The film is stretched first in the longitudinal direction and then in the transverse direction. However, simultaneous stretching is also possible, the not yet stretched film being stretched simultaneously in the longitudinal and transverse directions. In the case of sequential stretching, the film is preferably first fed to a longitudinal stretching unit (MDO) and stretched in the longitudinal direction (machine direction (MD)) at temperatures of 130 to 165° C. The film is then preferably stretched in a transverse direction (cross machine direction (TD)) in a transverse stretching oven (TDO). The transverse stretching is preferably carried out at temperatures in the range from 145 to 175° C., particularly preferably in the range from 150 to 170° C., more preferably in the range from 155 to 165° C., and most preferably in the range from 158 to 162° C. 160° C., in particular, is suitable. In each case, these are the temperatures of the film.

A method according to the invention is preferred, which is characterised in that the stretching ratios in the longitudinal direction and in the transverse direction are in the range from 3.5 to 7.5, particularly preferably in the range from 4 to 7. A method according to the invention is particularly preferred, which is characterised in that the stretching ratio in the longitudinal direction is in a range from 4 to 5.5 and the stretching ratio in the transverse direction is in a range from 4.5 to 6. Stretching ratios above 7.5 lead to films with poor mechanical properties or a film tear occurs in the oven during transverse stretching (transverse stretching oven, TDO). In contrast, the properties of the film, in particular the density and the mechanical properties, are in a balanced relationship to one another within the specified ranges. This is especially true for the narrower ranges. The stretching ratios in the longitudinal direction and in the transverse direction can differ. This can serve to adjust the mechanical properties in the longitudinal direction and in the transverse direction so that they are as similar as possible. Another important property of paper is its stiffness. Both during processing and during use, the film according to the invention should therefore have a stiffness similar to that of classic paper, if possible. The stiffness of the film obtained by the method according to the invention is also influenced by the stretching ratio. Since paper generally has anisotropic mechanical properties, the films according to the invention preferably also have the same mechanical properties in the longitudinal and transverse directions. The stretching ratio in the transverse direction is preferably 0.4 to 0.6 higher than the stretching ratio in the longitudinal direction. This applies in particular to sequential stretching.

Immediately after the film has been stretched, it is preferably subjected to a heat treatment (also "healing" or "annealing"). The stretching of the last stretching process is retained. The tensile forces acting on the film are therefore not reduced and the dimensions of the film are retained. The temperature of the film during the heat treatment is preferably about the same as or slightly above the temperature used during the stretching. The temperature of the film during the heat treatment is particularly preferably 5 to 20° C. and more preferably 5 to 15° C. above the last temperature used during the stretching.

Furthermore, relaxation is preferably carried out. Here, the transverse stretching of the last stretching process is slightly reduced at the beginning of the relaxation. For this purpose, the tensile forces that act on the film are reduced and the film contracts slightly. This relaxation can take place in the longitudinal direction, in the transverse direction or in both directions. The stretching is preferably reduced by up to 20%, more preferably by 2 to 15% and most preferably by 5 to 10%. The temperature of the film during relaxation is preferably at the same level as in the preceding method step or slightly below. The temperature of the film is preferably 5 to 20° C. below the temperature of the preceding method step.

As a result of the stretching of the film, the matrix of the thermoplastic polymer is partially detached from the inorganic filler and cavities are created in the film which can negatively affect the mechanical properties and other properties of the film. Through the heat treatment and the relaxation, these cavities can at least partially be closed again and the shrinkage behaviour, the mechanical properties such as tear resistance and modulus of elasticity, and the final density of the film can be improved and/or adjusted in this way.

The edge of the film is then preferably cut off. Furthermore, a surface treatment is preferably carried out. This can, for example, be a corona, plasma or flame treatment. Such a surface treatment results in a significantly improved surface tension. This is helpful, for example, if a subsequent printing or coating is to be carried out. Corona treatment is preferred. Finally, the film can be rolled up using a winder.

A typical method according to the invention is therefore a method for producing a film comprising at least one thermoplastic polymer and at least one inorganic filler, comprising the steps of:

providing a mixture comprising the at least one thermoplastic polymer and the at least one inorganic filler,
melting the mixture,
extruding the molten mixture through a wide-slot die to produce a thin layer,
cooling the resulting thin layer on a cooling roller by applying the thin layer with an air knife to produce a film,
stretching the film in the longitudinal direction at film temperatures of 130 to 165° C.,
stretching the longitudinally stretched film in the transverse direction at film temperatures of 145 to 175° C.,
heat treating the film stretched in the transverse direction at film temperatures which are 5 to 20° C. above the film temperature during the stretching in the transverse direction,
relaxing the film while reducing the stretching of the film in the transverse direction by up to 20%, at a film temperature which is 5 to 20° C. below the film temperature used for the heat treatment,
cutting off the edges of the film,
subjecting the film to a corona treatment,
winding up the film,
the proportion of the thermoplastic polymer in the film being at least 20 wt %, the proportion of the inorganic filler in the film being in the range from 50 to 75 wt % and the particle size of the inorganic filler being at most 5 µm, characterised in that the stretching ratio in the longitudinal direction is at least 3.5 and the stretching ratio in the transverse direction is also at least 3.5.

The thermoplastic polymer preferably comprises at least one polymer selected from the group consisting of polyethylene, polypropylene, polystyrene, polyethylene terephthalate, recycled polymers of the same, or mixtures thereof. The use of these polymers leads to particularly advantageous properties of the film. The thermoplastic polymer particularly preferably comprises a polymer which is selected from the group consisting of polyethylene, polypropylene or mixtures thereof. Polyethylene and polypropylene are particularly inexpensive and result in particularly stable films. The thermoplastic polymer particularly preferably comprises polypropylene. Most preferably it consists of polypropylene. Preferably, however, the thermoplastic polymer does not comprise polylactic acid. The polypropylene used preferably has a melt mass flow rate (MFR) according to ISO 1133 in the range from 0.1 to 25 g/10 min, more preferably in the range from 0.5 to 20 g/10 min and most preferably from 0.5 to 5 g/10 min. The polyethylene used preferably has a melt mass flow rate (MFR) according to ISO 1133 in the range from 0.02 to 15 g/10 min, particularly preferably in the range from 0.02 to 1.2 g/10 min.

Any inorganic filler can be used as the inorganic filler that is sufficiently pressure-stable and temperature-stable so that its properties do not change too much during processing. Furthermore, the inorganic filler should be stable against solar radiation and not decompose the thermoplastic polymer. The inorganic filler is preferably selected from the group consisting of calcium carbonate, carbon dust, calcium sulphate, barium sulphate, kaolin, mica, zinc oxide, dolomite, calcium silicate, glass, silicates, chalk, talc, pigment, titanium dioxide, silicon dioxide, bentonite, clay, diatomite and mixtures thereof. For example, glass can be used in the form of glass fibres or hollow microparticles of glass. However, calcium carbonate is particularly preferred. Most preferably, the filler consists of calcium carbonate. Calcium carbonate gives the film according to the invention a white colour and good mechanical properties. Calcium carbonate is also an easily accessible natural resource. The proportion of the inorganic filler in the film is preferably in the range from 50 to 70 wt %, particularly preferably in the range from 55 to 65 wt %. This is especially true for calcium carbonate.

The inorganic filler is used in the form of a powder. The particle size of the inorganic filler is preferably at most 5 μm, more preferably at most 3 μm and most preferably at most 2 μm. If the particles are too large, the mechanical properties and printability of the film are inadequate. Furthermore, it is preferred that the particle size of the inorganic filler is at least 0.1 μm, preferably at least 0.5 μm. If the particles are too small, the processability of the melt and the film are insufficient. In addition, such fine powders tend to generate dust, which causes problems during processing. These size specifications apply in particular to calcium carbonate. All particle sizes given here are mean particle sizes which are measured by laser diffractometry. The stated values are $d_{50}$ values, i.e. they indicate the value at which 50% of the particles are smaller than the stated value.

Furthermore, a method according to the invention is preferred which is characterised in that the film additionally comprises up to 25 wt % of at least one polyolefin elastomer. The at least one polyolefin elastomer is particularly preferably selected from the group consisting of polyisobutylene, ethylene propylene rubber and ethylene propylene diene monomer rubber (EPDM rubber). The use of polyolefin elastomers leads to a significantly improved foldability of the film.

Furthermore, a method according to the invention according to one of the preceding claims is preferred, which is characterised in that the film comprises auxiliary materials (additives). A method according to the invention is also preferred, which is characterised in that the film comprises at least one auxiliary material selected from the group consisting of adhesion promoters, dispersants, stabilisers, lubricants, antistatic agents, solid plasticisers, activators, promoters, anti-aging agents and agents that prevent burn marks, binders, heat-resistant agents, initiator agents, polymerisation catalysts, emulsifiers, plasticisers, stabilisers, heat light stabilisers, flame retardants and mould release agents. The film particularly preferably contains dispersants. Dispersants allow the stretching of films having a high proportion of filler and lead to a smooth surface. Furthermore, films which contain dispersants have particularly uniform thicknesses. The film preferably comprises up to 5% auxiliary materials. The film particularly preferably contains auxiliary materials in an amount in the range from 1 to 5 wt %. The film particularly preferably contains stretching aids, which are preferably selected from the group consisting of polyethylene waxes and polypropylene waxes. Polypropylene waxes are most preferred. Commercially available polyethylene waxes and polypropylene waxes of the Licocene® type from Clariant in Frankfurt/Main, Germany are suitable.

The film according to the invention can be a film having only a single layer or a multilayer film. Multilayer films are preferably produced by co-extrusion. Co-extrusion offers the possibility of varying the filler content in the individual layers and, if necessary, adapting it to the requirements. In particular, the surface properties can be optimised. Co-extrusion also offers the possibility of significantly reducing the cooling roller temperatures (to approx. 30° C.) by significantly reducing the filler content in the outer layers.

A method according to the invention is also preferred, which is characterised in that the film has a tear resistance in the longitudinal direction and in the transverse direction of at least 15 MPa, preferably of at least 18 MPa and particularly preferably of at least 20 MPa. Such a tear resistance is necessary so that the films can be used in a similar way to paper and have sufficient strength for the further processing of the film. Furthermore, a method according to the invention is preferred which is characterised in that the tear resistance of the film in the transverse direction deviates by no more than 50%, preferably no more than 40% and most preferably no more than 30% from the tear resistance of the film in the longitudinal direction. If the tensile strengths differ too much in the longitudinal and transverse directions, the films will splice too easily during processing and become unusable.

A method according to the invention is also preferred, which is characterised in that the film has a modulus of elasticity in the longitudinal direction and in the transverse direction of at least 150 MPa, preferably of at least 300 MPa, more preferably of at least 500 MPa, even more preferably of at least 800 MPa and most preferably of at least 1000 MPa. It is further preferred that the modulus of elasticity of the film in the transverse direction does not deviate by more than 50%, preferably not more than 30% and more preferably not more than 20% and most preferably not more than 10% from the modulus of elasticity of the film in the longitudinal direction. Here, too, it applies that these values for the modulus of elasticity give the film according to the invention paper-like properties.

The thickness of the film is preferably 5 μm to 1 mm, more preferably 10 μm to 300 μm and most preferably 20 μm to 180 μm. The particle size of the filler is preferably no greater than half the thickness of the film, particularly preferably no greater than a fifth of the thickness of the film. Also preferred is a method according to the invention which is characterised in that the standard deviation of the thickness of the film is not more than 30%, preferably not more than 20%, more preferably not more than 10%, and most preferably not more than 5%. The thickness is preferably determined with a conventional film thickness measuring device. To determine the standard deviation, 30 measurements are preferably used, which are carried out over the entire width of the film. A low standard deviation of the film thickness leads to good printability of the films, since the ink can be applied more evenly during printing.

Another important feature of the film according to the invention is density. Method according to one of the preceding claims, characterised in that the density of the film is less than 1.1 g/cm³, preferably less than 1.0 g/cm³, more preferably less than 0.9 g/cm³ and most preferably less than 0.8 g/cm³. In the case of densities above 1.1 g/cm³, the film is not assigned to the polyolefinic recycling stream in conventional recycling processes and is separated from the material cycle. The lower the density, the more reliably the film according to the invention is assigned to the polyolefinic recycling stream.

Another aspect of the present invention is a film produced by a method according to the invention.

Furthermore, one aspect of the present invention is a film which comprises at least one thermoplastic polymer in an amount of at least 20 wt % and an inorganic filler in an amount in the range from 50 to 75 wt %, wherein the thermoplastic polymer comprises at least one polymer that is selected from the group consisting of polyethylene, polypropylene and mixtures thereof, wherein the particle size of the inorganic filler is in a range from 0.1 μm to 5 μm and the thickness of the film is in a range from 20 μm to 180 μm and which is characterised in that the standard deviation of the thickness of the film is not more than 20%.

The standard deviation of the thickness of the film is particularly preferably not more than 10% and most preferably not more than 5%.

Another aspect of the present invention is the use of the films produced by the method according to the invention or the films according to the invention in carrier bags, packaging, pouches for food, as a paper substitute in aluminium & paper laminates, newspapers, notebooks, calendars, posters, labels, books, menus, etc., wherein the packaging can comprise for example tea bags or packaging for other foods such as butter wrap and may be pouches for food, for example, pouches for flour.

EXAMPLES

Example 1

Production of a biaxially stretched film comprising polypropylene (homopolymer?) and calcium carbonate and stretching at various stretching ratios.

40 wt % of a polypropylene having a melt mass flow rate (MFR) of 2 g/10 min and 60 wt % of a calcium carbonate having an average particle size of 1.6 μm were mixed in a co-rotating twin-screw extruder. The mixture (compound) obtained in this way was extruded and was extruded through a wide-slot nozzle. The melt was then cooled by means of a cooling roller and rectangular film portions were cut from the film thus obtained.

Figure 1:
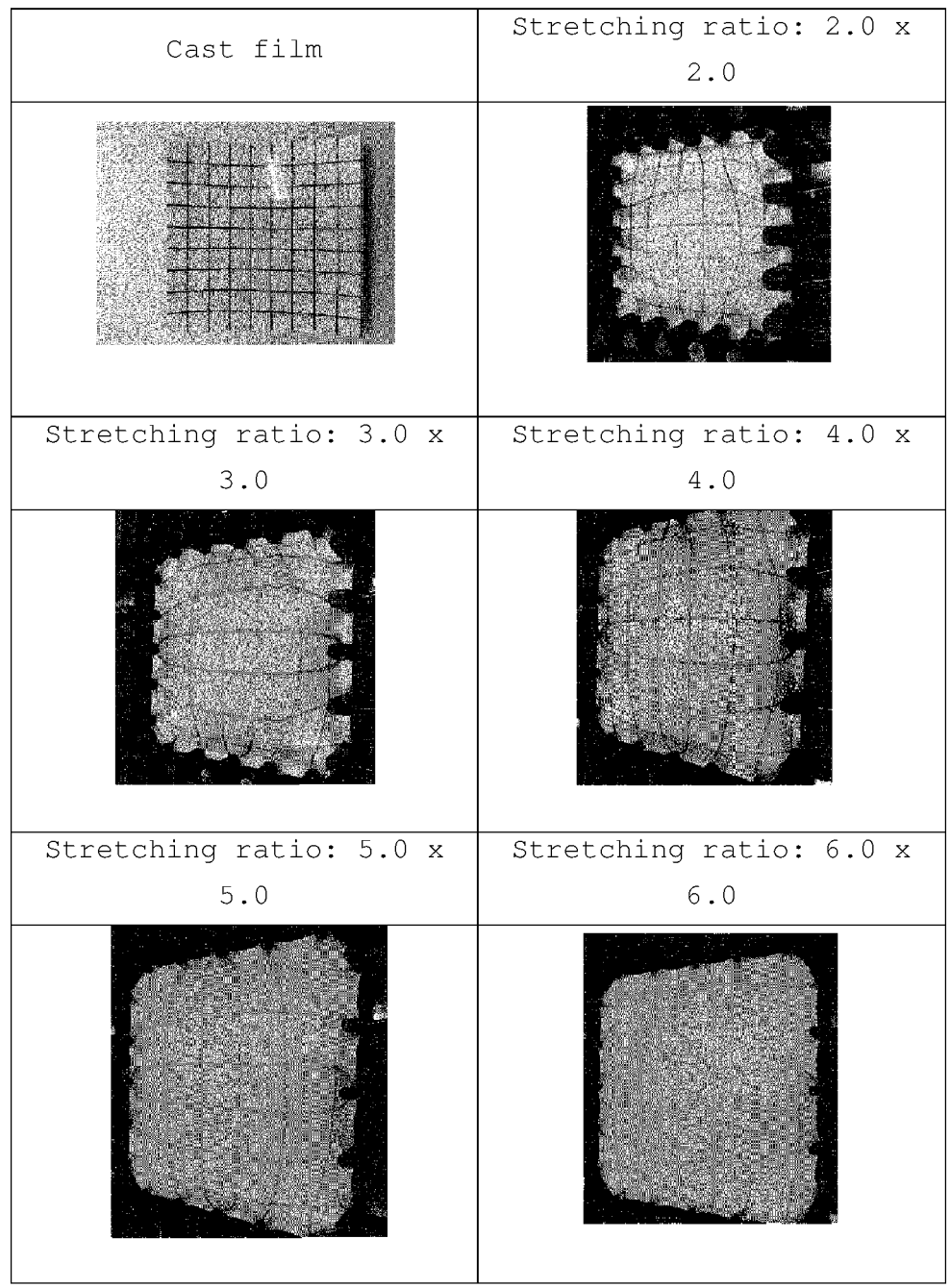
FIG. 1 shows a film after stretching at different stretching ratios.

A line pattern in the form of a chess board was applied to the film portions thus obtained (see FIG. 1, top left). A total of five identical films were then simultaneously stretched at different stretching ratios. A "Karo IV laboratory stretching frame" from Brückner Maschinenbau GmbH was used for this. The stretching ratios in the longitudinal and transverse directions were always the same. Stretching ratios of 2, 3, 4, 5 and 6 were used.

As can be seen in FIG. 1, this example shows that the lines in the middle of the films run more parallel at higher stretching ratios than at lower stretching ratios. In particular, at higher stretching ratios, the area of the squares surrounding the central square is approximately as large as the central square. Surprisingly, this indicates that with stretching ratios above 3 the stretching proceeds more evenly than with stretching ratios up to 3. This results in a more uniform film thickness at stretching ratios above 3 and thus also a lower standard deviation of the film thickness. This leads to a significantly better printability and better mechanical properties of the films.

Example 2

Production of biaxially stretched films comprising polypropylene and calcium carbonate having different compositions and stretching of the films at a stretching ratio in the longitudinal direction of 5 and in the transverse direction of 5.

Polypropylene and calcium carbonate and optionally dispersants and stabilisers were mixed on a co-rotating twin-screw extruder. Mixtures with 60 wt % calcium carbonate and formulations with 70 wt % calcium carbonate were produced. The mixtures (compounds) obtained in this way were extruded and pressed through a wide-slot nozzle. The thin layer (cast film) produced in this way was cooled on a cooling roller and rectangular film portions were cut from the resulting film, which were then simultaneously stretched with the above-mentioned stretching ratios in a "Karo IV laboratory stretching frame" from Brückner Group GmbH. The temperature of the film during stretching was set to 160° C. Table 1 shows the composition of the films and indicates whether a film could be obtained after stretching with a stretching ratio of 5×5:

TABLE 1

| No. | MFR-PP [g/10 min] | CaCO$_3$ particle size [μm] | Dispersants | Stabilisation | Stretchable? |
|---|---|---|---|---|---|
| Formulations with 60% CaCO$_3$ | | | | | |
| CF1 | 2 | 1.6 | No | No | Yes |
| CF2 | 19 | 1.6 | No | No | No |
| CF3 | 2 | 1.6 | Yes | No | Yes |
| CF4 | 19 | 1.6 | Yes | No | Yes |
| CF5 | 2 | 6.5 | Yes | No | No |
| CF6 | 19 | 6.5 | No | No | Yes |
| CF7 | 19 | 6.5 | Yes | No | Yes |
| Formulations with 70% CaCO$_3$ | | | | | |
| CF13 | 2 | 1.6 | Yes | No | No |
| CF14 | 2 | 1.6 | Yes | Yes | Yes |

CF: Cast film
MFR-PP: melt mass flow rate according to ISO 1133

The polypropylene homopolymer "Moplen® HP2624" from LyondellBasell, Rotterdam, Netherlands was used as the polypropylene having a melt mass flow rate of 2 g/10 min. The polypropylene homopolymer "Sabic® PP 576P" from Sabic, Riyadh, Saudi Arabia was used as the polypropylene having a melt mass flow rate of 19 g/10 min. "Omyafilm 707" from Omya GmbH, Hamburg, Germany is used as the calcium carbonate having a particle diameter d50=1.6 μm. "Omya BLH" also from Omya GmbH is used as the calcium carbonate having a particle diameter d50=6.5 μm. Both types of calcium carbonate are coated. In the experiments in which dispersant was added, 2% of the dispersant "Licowax® OP powder" from Clariant, Frankfurt/Main, Germany was added. In the experiments in which stabilisers were added, 1000 ppm of the acid scavenger "DHT-4A" from Kisuma Chemicals, Veendam, Netherlands and 500 ppm "Irganox B561" from BASF SE, Ludwigshafen, Germany were added.

Table 2 shows some properties of the films obtained having a calcium carbonate content of 60 and 70 wt %:

TABLE 2

| No. | Tensile strength [MPa] | | Modulus of elasticity [MPa] | | Density [g/cm$^3$] | Thickness [μm] | Standard deviation thickness [%] |
|---|---|---|---|---|---|---|---|
| | MD | TD | MD | TD | | | |
| Formulations with 60% CaCO$_3$ | | | | | | | |
| CF1 | 30 | 20 | 660 | 534 | 0.524 | 142.40 | 7.36 |
| CF3 | 43 | 31 | 999 | 855 | 0.692 | 100.71 | 2.64 |

TABLE 2-continued

| No. | Tensile strength [MPa] MD | Tensile strength [MPa] TD | Modulus of elasticity [MPa] MD | Modulus of elasticity [MPa] TD | Density [g/cm³] | Thickness [µm] | Standard deviation thickness [%] |
|---|---|---|---|---|---|---|---|
| CF4 | 32 | 18 | 800 | 651 | 0.570 | 162.29 | 12.11 |
| CF6 | 11 | 8.0 | 284 | 239 | 0.319 | 250.27 | 16.51 |
| CF7 | 12 | 8.5 | 281 | 242 | 0.325 | 237.03 | 10.81 |
| Formulations with 70% CaCO₃ | | | | | | | |
| CF14 | 16 | 10 | 322 | 241 | 0.583 | 134.44 | 28.79 |

As can be seen, all of the films produced have surprisingly low standard deviations in film thickness.

As can be seen, all of the films produced have surprisingly low standard deviations in film thickness.

Cast film 1 (CF1) has a very good standard deviation of the thickness, good values for the tear resistance, and still adequate values for the modulus of elasticity. CF1 thus offers a balanced distribution of properties and can be used as a paper substitute in many applications.

Figure 2:
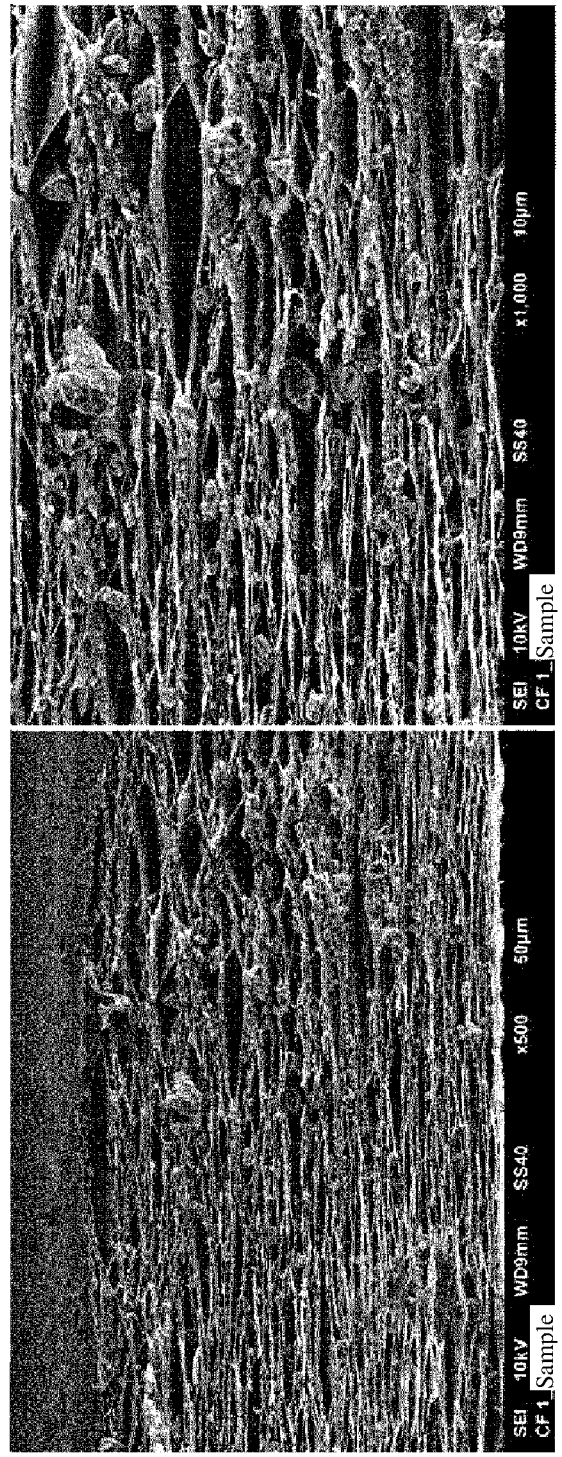
FIG. 2 shows a microscopic image of a film according to the invention without a dispersant.
Figure 3:
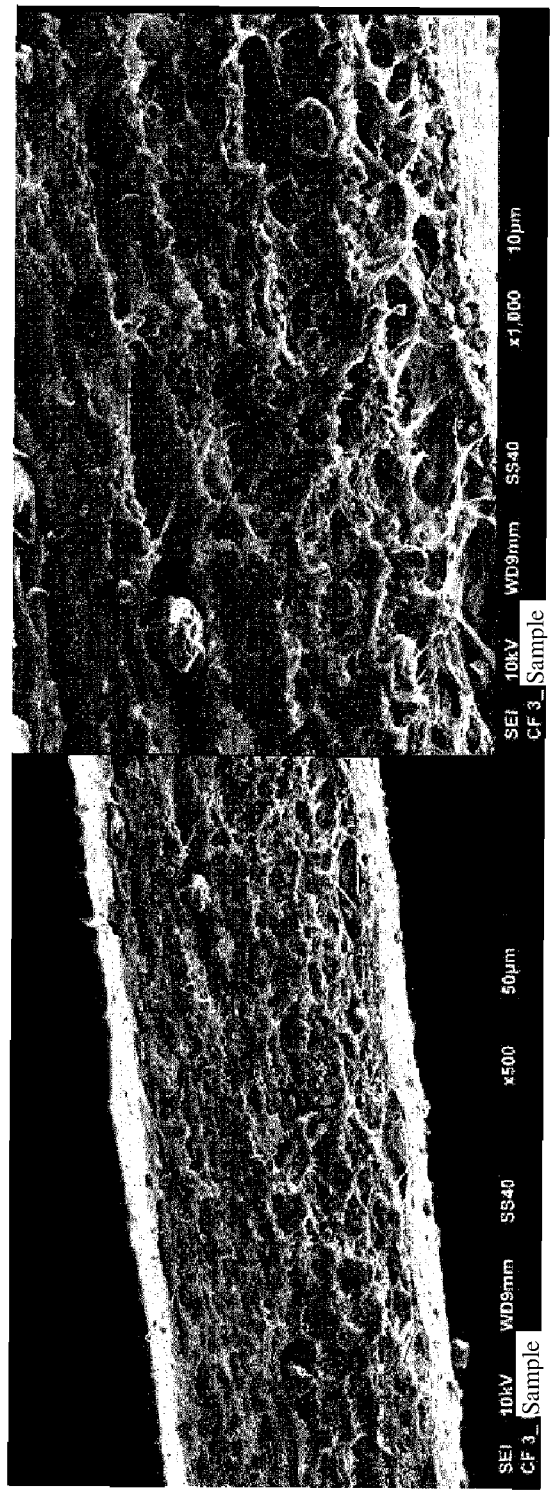
FIG. 3 shows a microscopic image of a film according to the invention with a dispersant.

Cast film 3 (CF3) performs best in every respect. It has the best standard deviation for film thickness, the lowest density reduction and the best mechanical properties. CF1 and CF3 only differ in the use of a dispersant (lubricant). FIG. 2 shows SEM images of sample cross sections of CF1 after stretching at 500-fold and 1000-fold magnification and FIG. 3 shows corresponding microscopic images of the surface of CF3. As can be seen, CF1 has a high porosity. This involves large oval openings that form around the calcium carbonate crystals. Here, the tension between the calcium carbonate particles and the polymer is apparently partially broken and relatively large openings and thus unevenness are formed. By using the dispersant, the so-called cavitation, i.e. the tearing off of the polypropylene matrix from the calcium carbonate particles, is significantly suppressed, which also has a positive effect on the density reduction. The dispersant thus prevents the formation of larger openings around the calcium carbonate particles and leads to a more uniform surface of the film and thus also to lower standard deviations in the film thickness. Surprisingly, this leads to an excellent standard deviation of the film thickness of only 2.64%.

At 0.692 g/cm³, the density of CF3 is only slightly higher than that of CF1, but is still well below 1 g/cm³. The tear resistance in the longitudinal and in the transverse direction is well over 20 MPa and the tear resistance in the transverse direction only deviates by about 28% from the tear resistance in the longitudinal direction. This should sufficiently prevent splicing of the film during further processing. At almost 1000 MPa, the moduli of elasticity are sufficiently high in both directions and hardly deviate from one another (around 14%).

In order to be able to replace classic paper as completely as possible, stone paper should have a tear resistance of at least about 20 MPa and a modulus of elasticity of about 1000 MPa. A modulus of elasticity in the range from 800 to 1200 MPa is acceptable in this context. Furthermore, foldability and splicing should resemble the behaviour of classic paper. CF3 ideally fulfils all of these conditions.

A comparison of CF4 with CF3 shows the influence of using polymers having high melt mass flow rates. The standard deviation of the film thickness increases significantly to 12.11%. However, the value is still acceptable for many printing applications. The tear resistances and the moduli of elasticity decrease slightly, but are still acceptable. The deviations in the tear resistances and the moduli of elasticity from one another increase, but are also still acceptable.

CF6 and CF7 show the effect of calcium carbonate particles having a relatively large particle size of more than 5 µm. The mechanical properties have clearly deteriorated. These films are no longer suitable for all applications in which paper is normally used. But they are still useful for many applications. However, for these examples too, the standard deviation of the film thickness is still in an acceptable range. A comparison of CF6 and CF7 also shows the positive effect of the dispersant on the standard deviation of the film thickness.

With a calcium carbonate content of 70 wt %, reasonably good mechanical properties could also be achieved (see CF14). Stabilisation is advantageous here (see comparison CF13 with CF14). Stabilisation is necessary to avoid the degradation of the polymer. Without stabilisation, stretching at such high fill levels is difficult. With these high proportions of calcium carbonate, the same standard deviations of the film thickness cannot be achieved as with 60 wt % calcium carbonate.

Some of the films were not stretchable under the conditions used. Higher stretching temperatures or higher amounts of auxiliary materials or other changes in the experimental conditions could correct this problem. However, this would impair the comparability of the tests. That is why it was dispensed with. The mechanical properties can also be improved by increasing the stretching temperatures. However, this hardly improves the standard deviations of the film thicknesses.

Table 3 shows two of the optical properties of the films, opacity and whiteness:

TABLE 3

| No. | Opacity [%] | Whiteness |
|---|---|---|
| Formulations with 60% CaCO₃ | | |
| CF1 | 98.4 | 81.7 |
| CF3 | 96.3 | 79.1 |
| CF4 | 98.7 | 82.3 |
| CF6 | 96.9 | 75.3 |
| CF7 | 96.5 | 73 |
| Formulations with 70% CaCO₃ | | |
| CF14 | 99.7 | 84.3 |

Example 3

Production of two films like CF1 and CF3 in example 2, but with a stretching ratio of 7 in the longitudinal direction and 7 in the transverse direction. The stretching also took place simultaneously on a "Karo IV laboratory stretching frame" from Brückner Maschinenbau GmbH. Table 4 shows the properties of the films obtained:

TABLE 4

| Description | Unit | Stretching to 7 × 7 CF1 | Stretching to 7 × 7 CF3 |
|---|---|---|---|
| Final film thickness | µm | 102.24 | 69.74 |
| Standard deviation thickness | % | 8.19 | 1.90 |

TABLE 4-continued

| | | Stretching to 7 × 7 | |
|---|---|---|---|
| Description | Unit | CF1 | CF3 |
| Tensile strength MD | MPa | 34 | 47 |
| Tensile strength TD | MPa | 29 | 37 |
| Elongation until break MD | % | 50 | 54 |
| Elongation until break TD | % | 59 | 64 |
| Modulus of elasticity MD | MPa | 763 | 1394 |
| Modulus of elasticity TD | MPa | 763 | 1177 |
| Opacity | % | 96.2 | 91.6 |
| Whiteness | — | 82.1 | 80.3 |
| Surface weight | g/m² | 58.49 | 53.26 |
| Density | g/cm³ | 0.568 | 0.727 |

As can be seen, with the CF3 the standard deviation of the film thickness is further improved by the higher stretching ratios, which leads to an extremely low value of only 1.90%. With the CF1, the effect of the higher stretching ratios is very small. The use of a dispersant thus increases the positive effect of a high stretching ratio.

Example 4

A mixture consisting of 32 wt % polypropylene homopolymer having an MFR of 2 g/10 min ("Moplen® HP PP-520H" from LyondellBasell, Rotterdam, Netherlands), 65 wt % of calcium carbonate having a diameter $d_{50}$ of 1.4 µm ("Filmlink® 400", Imerys Minerals, Cornwall, UK), 0.16 wt % of additives (400 ppm of the acid scavenger "DHT-4A" from Kisuma Chemicals, Veendam, Netherlands and 1200 ppm "Irganox B561" from BASF SE, Ludwigshafen, Germany) and 1.84 wt % dispersant ("Licowax OP® powder" from Clariant, Frankfurt/Main, Germany) was diluted with the above pure polypropylene homopolymer to a total calcium carbonate content in the film of 25 wt % (A) or 59 wt % (B). Two different mixtures were thus made with different calcium carbonate contents. A multilayer film having an ABA structure was produced from these two mixtures, with B representing the core and A the coatings. The calcium carbonate content in the core was accordingly 59 wt % and the calcium carbonate content in the coatings 25 wt %. The film was produced in accordance with example 1 by co-extrusion.

After co-extruding and cooling, the film was stretched sequentially. First stretched with a stretching ratio of 5 in the longitudinal direction and then with a stretching ratio in the transverse direction. After the stretching in the transverse direction, a heat treatment was carried out with a relaxation of 10% in the transverse direction, i.e. a reduction in the stretching ratio from 5 to 4.5 in the transverse direction. The temperatures during stretching and during heat treatment are shown in Table 5.

TABLE 5

| Process conditions | Sample roll 1 | Sample roll 2 |
|---|---|---|
| | MDO temperatures [° C.] | |
| Preheat roller 1 | 110 | |
| Preheat roller 2 | 120 | |
| Preheat roller 3 | 142 | |
| Preheat roller 4 | 140 | |
| Preheat roller 5 | 146 | |
| Preheat roller 6 | 142 | |
| Stretching roller 1 | 148 | |
| Stretching roller 2 | 146 | |
| Stretching roller 3 | 115 | |
| Stretching roller 4 | 115 | |
| Annealing roller 1 | 120 | |
| Annealing roller 2 | 120 | |
| MD stretching | 5 | |

Figure 4:
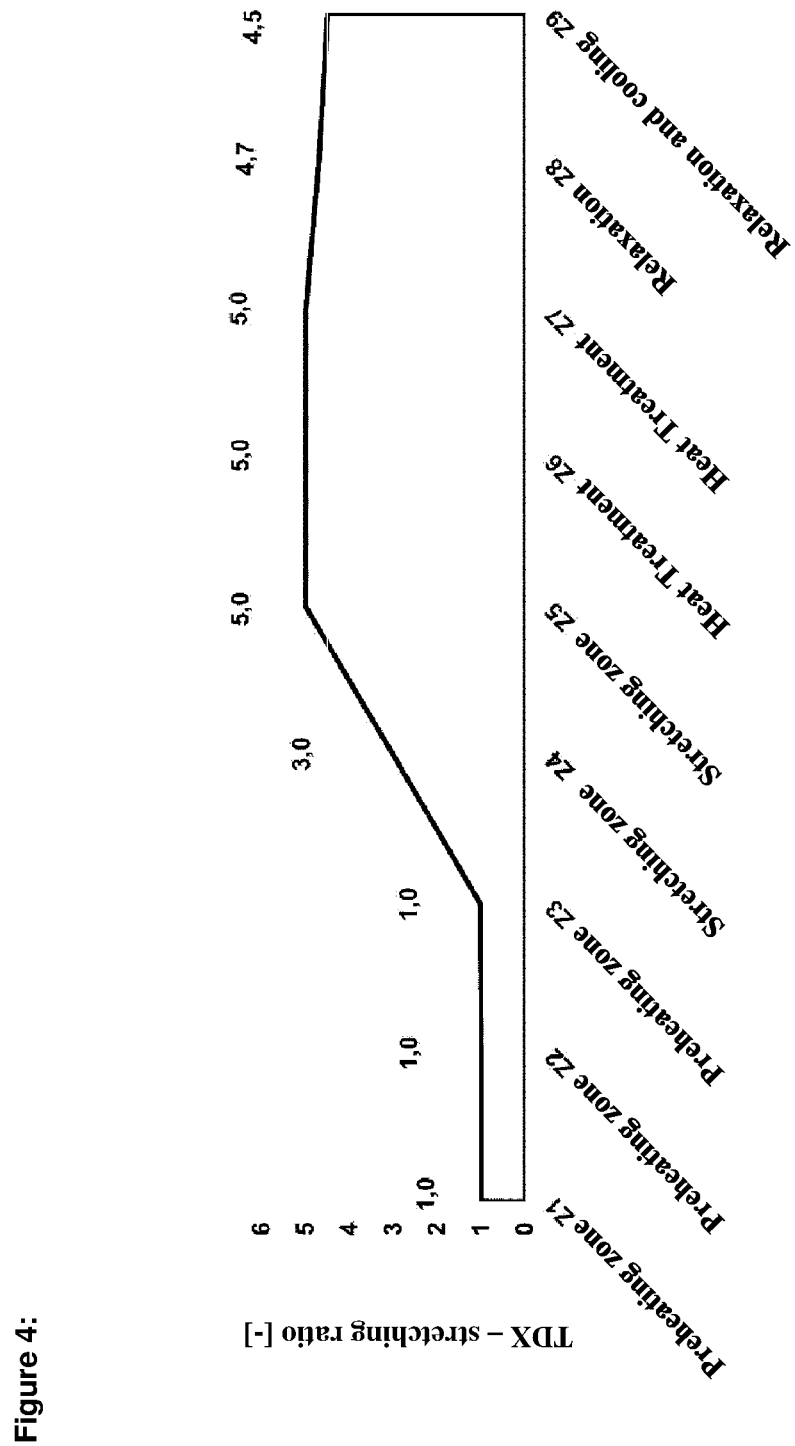
FIG. 4 shows the profile of the stretching in the transverse direction for example 4, sample roll 1 and sample roll 3.
Figure 5:
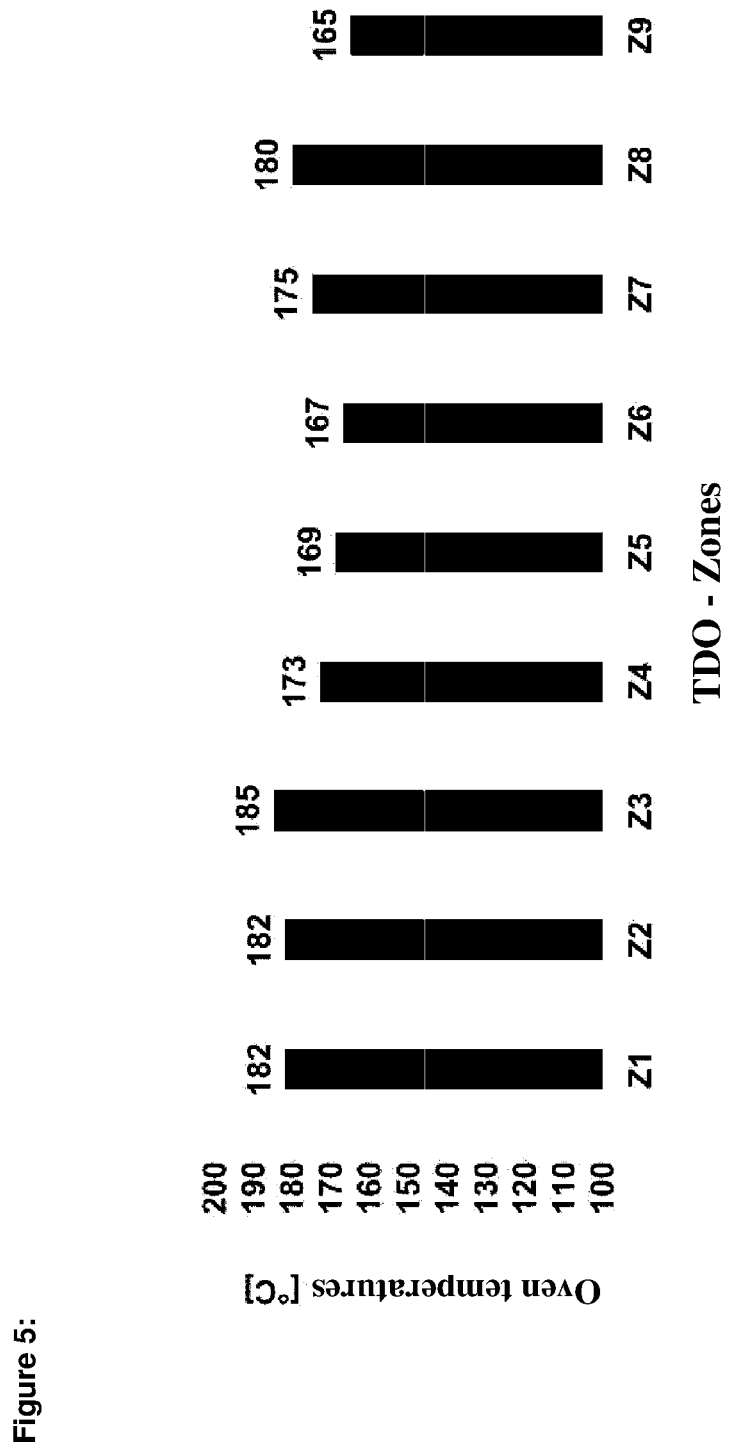
FIG. 5 shows the temperature profile during stretching in the transverse direction for example 4, sample roll 1.
Figure 6:
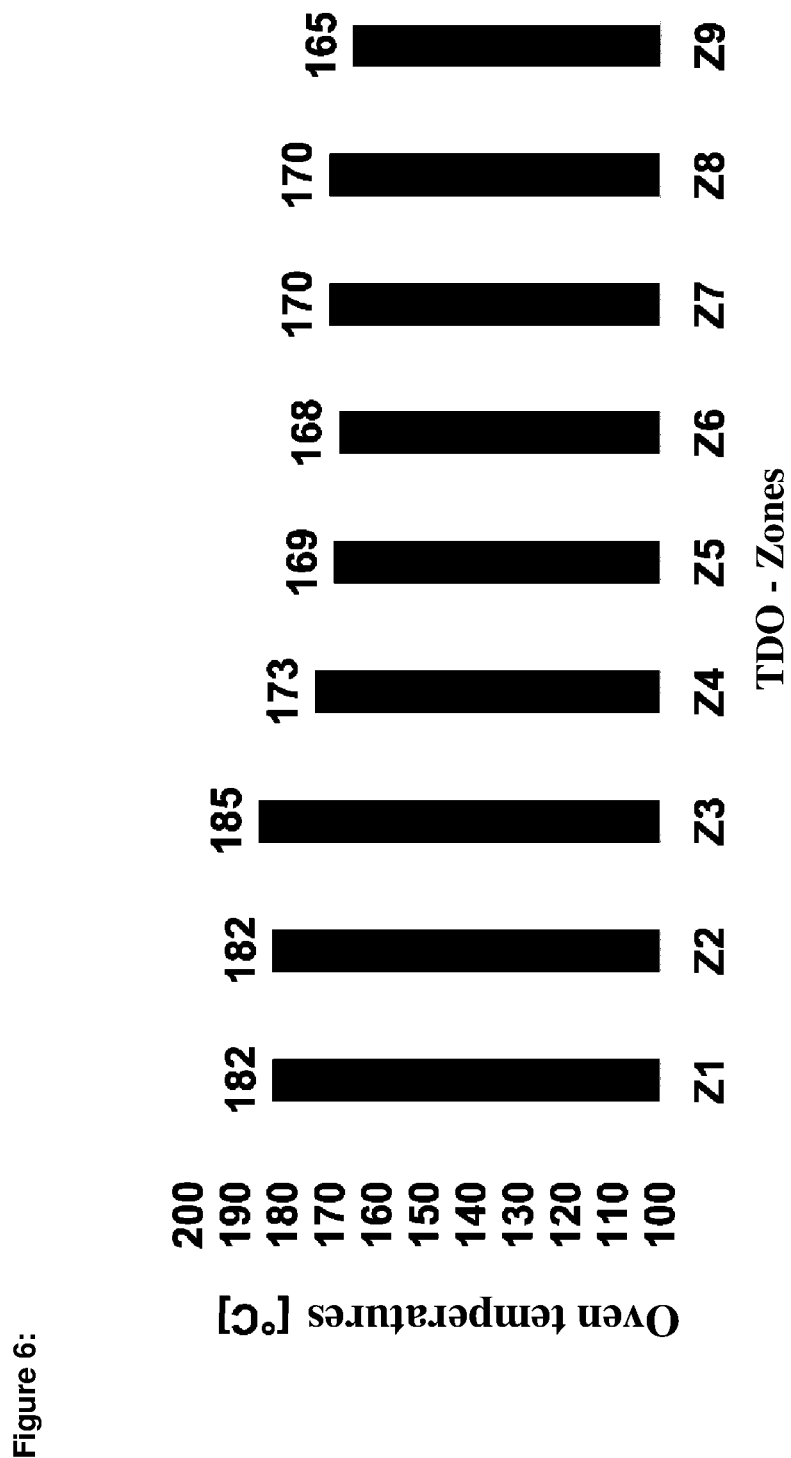
FIG. 6 shows the temperature profile during stretching in the transverse direction for example 4, sample roll 3.

FIG. 4 shows the stretching profile in the stretching oven during stretching in the transverse direction for the two tests, sample roll 1 and sample roll 2, which were both carried out with the film obtained as described above. The stretching oven is divided into zones Z1 to Z9, wherein Z1 to Z3 represent preheating zones (preheating), Z4 and Z5 zones in which stretching is carried out (stretching), Z6 and Z7 zones in which heat treatment (annealing) is carried out without stretching, Z8 a zone in which the film is relaxed (relaxation) and zone 9 a zone in which both relaxation and cooling (relaxation & cooling) are carried out. As can be seen from FIG. 4, after stretching in the longitudinal direction, the films were first stretched to a stretching ratio in the transverse direction of 5, then held at this stretching ratio for a while and then relaxed to a final stretching ratio of 4.5. FIG. 4 shows in which zone the stretching is done and by how much. FIG. 5 shows the temperature profile of the oven temperature for sample roll 1 and FIG. 6 shows the temperature profile of the oven temperature for sample roll 2. The oven temperatures for the individual zones Z1 to Z9 are specified separately. In the overview of FIGS. 4 to 6, the correlation of the zone of the stretching oven, oven temperature and stretching ratio is therefore given for both experiments. As can be seen from a comparison of FIGS. 5 and 6, the temperature in sample roll 1 is increased before the start, at the start and during relaxation (cf. zones Z7 and Z8).

Table 6 shows the properties of the films thus obtained:

TABLE 6

| Description | | Unit | Sample roll 1 | Sample roll 2 |
|---|---|---|---|---|
| Final film thickness | | um | 60 | 89.4 |
| Standard deviation thickness | | % | 5.98 | 9.62 |
| Tensile strength | MD | MPa | 20 | 32 |
| Tensile strength | TD | MPa | 26 | 29 |
| Modulus of elasticity | MD | MPa | 1590 | 525 |
| Modulus of elasticity | TD | MPa | 1622 | 583 |
| Opacity | | % | 75 | 96 |
| Whiteness | | — | 81 | 86 |
| Density | | g/cm³ | 1.024 | 0.65 |
| Foldability | | | very good | very bad |

Due to the higher temperatures during the heat treatment, the density reduction could be significantly revised and the mechanical properties could be significantly improved.

Due to the higher temperatures during the heat treatment, the density reduction could be significantly revised and the mechanical properties could be significantly improved.

Example 5

From a mixture consisting of 65 wt % polypropylene homopolymer having a MFR of 2 g/10 min ("Moplen® PP-HP 520H" from LyondellBasell, Rotterdam, Netherlands), 15.84 wt % calcium carbonate having an diameter $d_{50}$ of 1.4 µm ("Filmlink® 400", Imerys Minerals, Cornwall, UK), 16 wt % polyolefin elastomer (POE) (Engage 8137, The Dow Chemical Company, Midland, USA), 0.16 wt % additives (400 ppm "DHT-4A" from Kisuma Chemicals, Veendam, Netherlands and 1200 ppm "Irganox B561" from BASF SE, Ludwigshafen, Germany) and wt % dispersant ("Licowax OP® powder" Clariant, Frankfurt/Main, Germany), two different mixtures having a calcium carbonate content of 58 wt % (b) and 25 wt % (A) are produced by adding the aforementioned calcium carbonate. A multilayer film having an ABA structure was produced from this by co-extrusion, with B representing the core and A the coatings. The calcium carbonate content in the core was 58 wt % and the calcium carbonate content in the coatings was 25 wt %. The film was otherwise produced in accordance with example 1.

First the film was co-extruded and then cooled. The film was then stretched sequentially, first with a stretching ratio of 5 in the longitudinal direction and then with a stretching ratio of 4.7 in the transverse direction. A heat treatment was carried out after the stretching in the transverse direction. A relaxation of 6% in the transverse direction was carried out during the heat treatment, that is to say to a final stretching ratio of 4.4 in the transverse direction. The temperatures during stretching and during heat treatment are shown in Table 7.

TABLE 7

| Process conditions | Sample roll 3 MDO temperatures [° C.] |
| --- | --- |
| Preheat roller 1 | 110 |
| Preheat roller 2 | 110 |
| Preheat roller 3 | 126 |
| Preheat roller 4 | 128 |
| Preheat roller 5 | 128 |
| Preheat roller 6 | 130 |
| Stretching roller 1 | 142 |
| Stretching roller 2 | 140 |
| Stretching roller 3 | 115 |
| Stretching roller 4 | 115 |
| Annealing roller 1 | 120 |
| Annealing roller 2 | 120 |
| MD - stretching | 5 |

Figure 7:
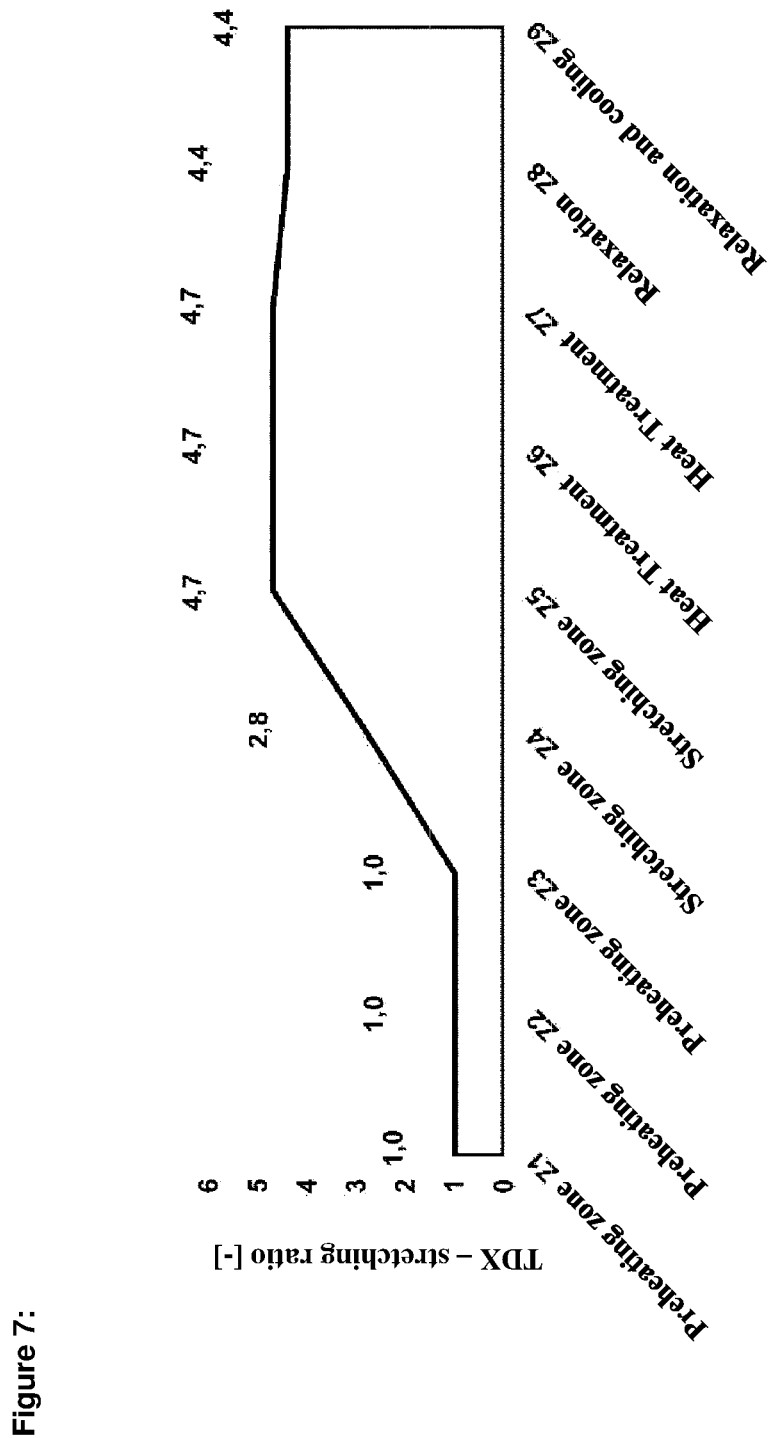
FIG. 7 shows the profile of the stretching in the transverse direction for example 5.
Figure 8:
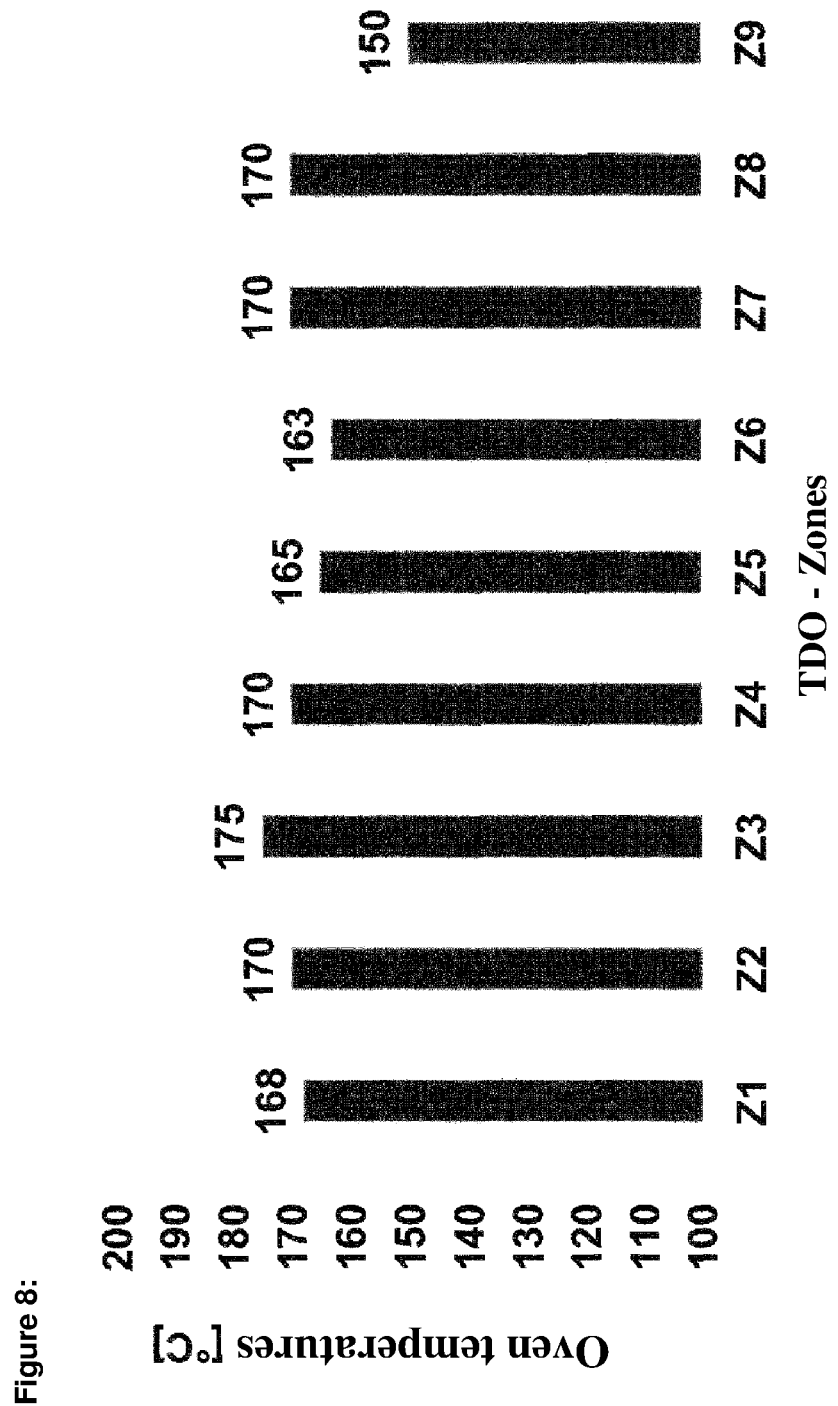
FIG. 8 shows the temperature profile during stretching in the transverse direction for example 5.

FIG. 7 shows the stretching profile in the stretching oven during stretching in the transverse direction for sample roll 3. Here it can clearly be seen in which zone and by which factor stretching is carried out. The stretching oven is divided into zones Z1 to Z9, wherein Z1 to Z3 represent preheating zones (preheating), Z4 and Z5 zones in which stretching is carried out (stretching), Z6 and Z7 zones in which heat treatment (annealing) is carried out without stretching, Z8 a zone in which the film is relaxed (relaxation) and zone 9 a zone in which both relaxation and cooling (relaxation & cooling) are carried out. As can be seen from FIG. 4, the film was first stretched to a stretching ratio in the longitudinal direction of 4.7, then held at this stretching ratio for a while and then relaxed to a final stretching ratio of 4.4. FIG. 7 shows in which zone the stretching is done and by how much. FIG. 8 shows the temperature profile of the oven temperature for sample roll 3. The oven temperatures for the individual zones Z1 to Z9 are specified separately. In the overview of FIGS. 7 and 8, the correlation of the zone of the stretching oven, oven temperature, and stretching ratio is therefore given.

Table 8 shows the properties of the film thus obtained:

TABLE 8

| Description | | Unit | Sample roll 3 |
| --- | --- | --- | --- |
| Final film thickness | | um | 70.4 μm |
| Standard deviation thickness | | % | 2.7 |
| Tensile strength | MD | MPa | 26.9 |
| | TD | MPa | 19.8 |
| Modulus of elasticity | MD | MPa | 196 |
| | TD | MPa | 203 |
| Opacity | | % | 93 |
| Whiteness | | % | 87 |
| Density | | g/cm$^3$ | 0.77 |
| Foldability | | | very good |

The mechanical properties of this film are no longer quite as good as with the pure PP as a matrix. However, the foldability (dead-fold properties) could be significantly improved. Polyolefin elastomers can therefore be used in order to improve the foldability of the films according to the invention.

The invention claimed is:

1. A method for producing a film comprising at least one thermoplastic polymer and at least one inorganic filler, comprising the steps of:
   providing a mixture comprising at least one thermoplastic polymer and at least one inorganic filler,
   melting the mixture,
   producing a thin layer from the molten mixture,
   cooling the resulting thin layer to produce a film,
   stretching the film in the longitudinal direction and in the transverse direction,
the proportion of the thermoplastic polymer in the film being at least 20 wt %, the proportion of the inorganic filler in the film being in the range from 50 to 75 wt % and the particle size of the inorganic filler being at most 5 μm, wherein the stretching ratio in the longitudinal direction is at least 3.5 and the stretching ratio in the transverse direction is also at least 3.5,
wherein the film comprises dispersants, and
wherein the standard deviation of the thickness of the film is not more than 30% of the average film thickness.

2. The method according to claim 1, wherein the stretching of the film is carried out sequentially in the longitudinal direction and in the transverse direction.

3. The method according to claim 1, wherein the stretching ratios in the longitudinal direction and in the transverse direction are in the range from 3.5 to 7.5.

4. The method according to claim 1, wherein the stretching ratios in the longitudinal direction and in the transverse direction are in the range from 4 to 7.

5. The method according to claim 1, wherein the stretching ratio in the longitudinal direction is in a range from 4 to 5.5 and the stretching ratio in the transverse direction is in a range from 4.4 to 6.

6. The method according to claim 1, wherein the at least one thermoplastic polymer is selected from the group consisting of polyethylene, polypropylene or mixtures thereof.

7. The method according to claim 1, wherein the inorganic filler is selected from the group consisting of calcium carbonate, carbon dust, powder, calcium sulphate, barium sulphate, kaolin, mica, zinc oxide, dolomite, calcium silicate, glass, silicates, chalk, talc, pigment, titanium dioxide, silicon dioxide, bentonite, clay, diatomite, and mixtures thereof.

8. The method according to claim 1, wherein the inorganic filler is calcium carbonate.

9. The method according to claim 1, wherein the particle size of the inorganic filler is at most 3 μm.

10. The method according to claim 1, wherein the particle size of the inorganic filler is at least 0.1 μm.

11. The method according to claim 1, wherein the film additionally comprises more than 0 wt % and up to 25 wt % of at least one polyolefin elastomer.

12. The method according to claim 11, wherein the at least one polyolefin elastomer is selected from the group consisting of polyisobutylene, ethylene propylene rubber and ethylene propylene diene monomer rubber.

13. The method according to claim 1, wherein the film comprises up to 5% auxiliary materials.

14. The method according to claim 1, wherein the film comprises at least one auxiliary material selected from the group consisting of adhesion promoters, stabilisers, lubricants, antistatic agents, solid plasticisers, activators, promoters, anti-aging agents, agents for preventing burn marks, binders, heat-resistant agents, initiator agents, polymerisation catalysts, emulsifiers, plasticisers, heat stabilisers, light stabilisers, flame retardants and mould release agents.

15. The method according to claim 1, wherein the film comprises stretching aids.

16. A film produced by a method according to claim 1.

* * * * *